(12) United States Patent
Twiss

(10) Patent No.: US 7,852,767 B2
(45) Date of Patent: Dec. 14, 2010

(54) METHODS AND APPARATUS FOR ROUTING IN A NETWORK

(75) Inventor: Adam Twiss, Cambridge (GB)

(73) Assignee: Velocix Limited, Cambridgeshire (GB)

( * ) Notice: Subject to any disclaimer, the term of this patent is extended or adjusted under 35 U.S.C. 154(b) by 370 days.

(21) Appl. No.: 10/588,586

(22) PCT Filed: Jan. 24, 2005

(86) PCT No.: PCT/GB2005/000234

§ 371 (c)(1),
(2), (4) Date: Jun. 13, 2007

(87) PCT Pub. No.: WO2005/079020

PCT Pub. Date: Aug. 25, 2005

(65) Prior Publication Data

US 2008/0049619 A1 Feb. 28, 2008

Related U.S. Application Data

(60) Provisional application No. 60/543,539, filed on Feb. 12, 2004.

(30) Foreign Application Priority Data

Feb. 9, 2004 (GB) ................................. 0402739.7

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)

(52) U.S. Cl. ....................... 370/235; 370/236; 370/386; 370/389; 709/238; 709/242

(58) Field of Classification Search ................. 370/236, 370/349, 229, 235, 386, 389, 392, 395.1, 370/395.31, 395.32, 395.4, 395.52, 395.72, 370/401, 471, 496; 709/238, 242, 243, 244
See application file for complete search history.

(56) References Cited

U.S. PATENT DOCUMENTS 4,805,137 A * 2/1989 Grant et al. ................. 710/107
(Continued)

FOREIGN PATENT DOCUMENTS

WO PCT/GB2004/00213 1/2004

OTHER PUBLICATIONS

Ciglarič, Mojca, et al., Content Networks: Distributed Routing Decisions in Presence of Repeated Queries, *Proceedings of the International Parallel and Distributed Symposium (IPDPS'03)*, 2003, six pages.

(Continued)

*Primary Examiner*—Aung S Moe
*Assistant Examiner*—Benjamin Elliott
(74) *Attorney, Agent, or Firm*—Kramer & Amado, P.C.

(57) ABSTRACT

The invention generally relates to methods and apparatus for routing data in networks, in particular packet data routing in TCP/IP (Transmission Control Protocol/Internet Protocol). Application of the invention include routing of peer-to-peer (P2P) network data. A method of controlling traffic on a data network, said traffic comprising payload data and associated signaling data, the method comprising reading a portion of said payload data for a communications session between a first entity and a second entity communicating over said network; determining whether said portion of payload data identifies a type of traffic to be controlled; storing, responsive to said determining, signaling data associated with said portion of payload data; reading said signaling data to identify an attempt to begin a further communications session of said identified traffic type or to resume said communication session; and controlling traffic of said further or resumed communications session responsive to said identification.

19 Claims, 9 Drawing Sheets

U.S. PATENT DOCUMENTS

| | | | | |
|---|---|---|---|---|
| 5,502,724 | A * | 3/1996 | Chen et al. | 370/445 |
| 5,550,914 | A * | 8/1996 | Clarke et al. | 379/230 |
| 5,870,567 | A * | 2/1999 | Hausauer et al. | 710/310 |
| 5,953,502 | A * | 9/1999 | Helbig, Sr. | 726/24 |
| 6,098,180 | A * | 8/2000 | Kobata et al. | 714/18 |
| 6,269,099 | B1 * | 7/2001 | Borella et al. | 370/389 |
| 6,466,578 | B1 * | 10/2002 | Mauger et al. | 370/395.3 |
| 6,542,968 | B1 * | 4/2003 | Spencer et al. | 711/137 |
| 6,636,480 | B1 * | 10/2003 | Walia et al. | 370/229 |
| 6,650,642 | B1 * | 11/2003 | Sugai et al. | 370/392 |
| 6,708,233 | B1 * | 3/2004 | Fuller et al. | 710/22 |
| 6,728,270 | B1 * | 4/2004 | Meggers et al. | 370/514 |
| 6,754,188 | B1 * | 6/2004 | Garahi et al. | 370/328 |
| 6,832,282 | B2 * | 12/2004 | Duncan et al. | 710/306 |
| 6,928,082 | B2 * | 8/2005 | Liu et al. | 370/401 |
| 6,954,797 | B1 * | 10/2005 | Takeda et al. | 709/236 |
| 7,092,391 | B2 * | 8/2006 | Umeda | 370/392 |
| 7,181,536 | B2 * | 2/2007 | Burbeck et al. | 709/245 |
| 7,209,448 | B2 * | 4/2007 | Oskouy et al. | 370/238 |
| 7,287,092 | B2 * | 10/2007 | Sharp | 709/245 |
| 7,508,768 | B2 * | 3/2009 | Yoon et al. | 370/252 |
| 7,571,251 | B2 * | 8/2009 | Bowman | 709/242 |
| 7,660,889 | B2 * | 2/2010 | Gotesdyner et al. | 709/224 |
| 2001/0026556 | A1 * | 10/2001 | Yagyu et al. | 370/432 |
| 2002/0141384 | A1 * | 10/2002 | Liu et al. | 370/352 |
| 2002/0147810 | A1 * | 10/2002 | Traversat et al. | 709/224 |
| 2002/0161836 | A1 * | 10/2002 | Hosomi | 709/203 |
| 2003/0009586 | A1 * | 1/2003 | Harrow et al. | 709/238 |
| 2003/0208621 | A1 * | 11/2003 | Bowman | 709/242 |
| 2003/0229900 | A1 * | 12/2003 | Reisman | 725/87 |
| 2004/0125776 | A1 * | 7/2004 | Haugli et al. | 370/338 |
| 2004/0165587 | A1 * | 8/2004 | Kiyoto et al. | 370/389 |
| 2005/0226216 | A1 * | 10/2005 | Oyama et al. | 370/351 |
| 2006/0168262 | A1 * | 7/2006 | Frazer | 709/230 |
| 2006/0168304 | A1 * | 7/2006 | Bauer et al. | 709/232 |
| 2006/0190716 | A1 * | 8/2006 | Miller | 713/150 |
| 2008/0049619 | A1 * | 2/2008 | Twiss | 370/236 |
| 2008/0089238 | A1 * | 4/2008 | Fahmy | 370/252 |
| 2008/0162639 | A1 * | 7/2008 | Kang et al. | 709/205 |

OTHER PUBLICATIONS

Harrison, Ann, Packeteer: Another take on limiting P2P traffic, *Network World Peer-to-Peer Newsletter* (online), Apr. 3, 2002, http://www.nwfusion.com/newsletters/fileshare/2002/01297785.html.

Kwon, Gisik, et al., An Efficient Peer-to-Peer File Sharing Exploiting Hierarchy and Assymetry, *IEEE/IPSJ 2003 Symposium on Applications and Internet (SAINT'03)* (online), Jan. 27, 2003, http://www.public.asu.edu/~kryu1/papers/PASS-SAINT03.pdf, p. 226, Abstract.

Oram, Andy, *Peer-to-peer: Harnessing the Benefits of a Disruptive Technology passage*, Mar. 15, 2001, Chapter 8, "Gnutella," pp. 94-122.

Sen, Subhabrata, et al, Analyzing Peer-to-Peer Traffic Across Large Networks, *IEEE/ACM Transactions on Networking*, vol. 12, No. 2, Apr. 2004, pp. 219-232.

\* cited by examiner

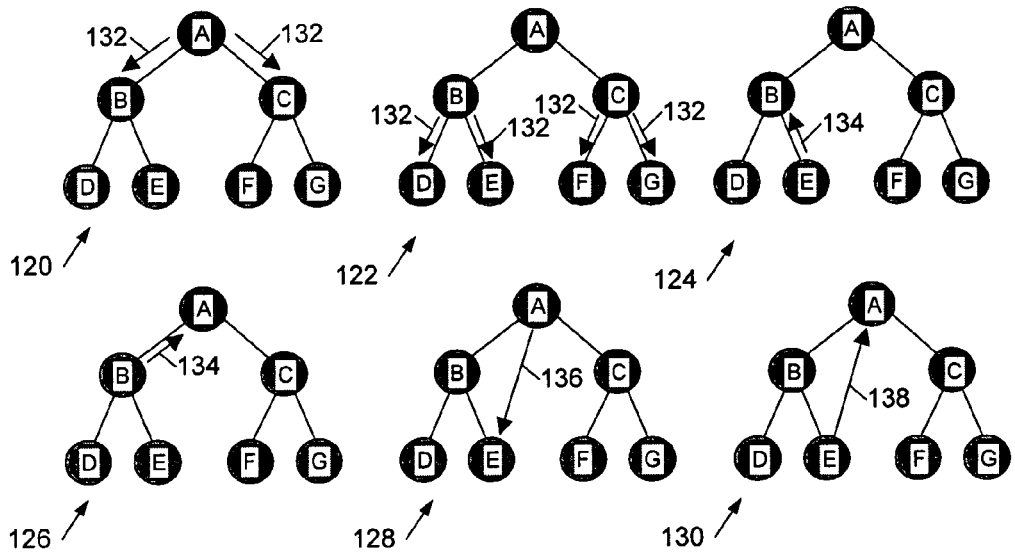
Figure 1c
(PRIOR ART)
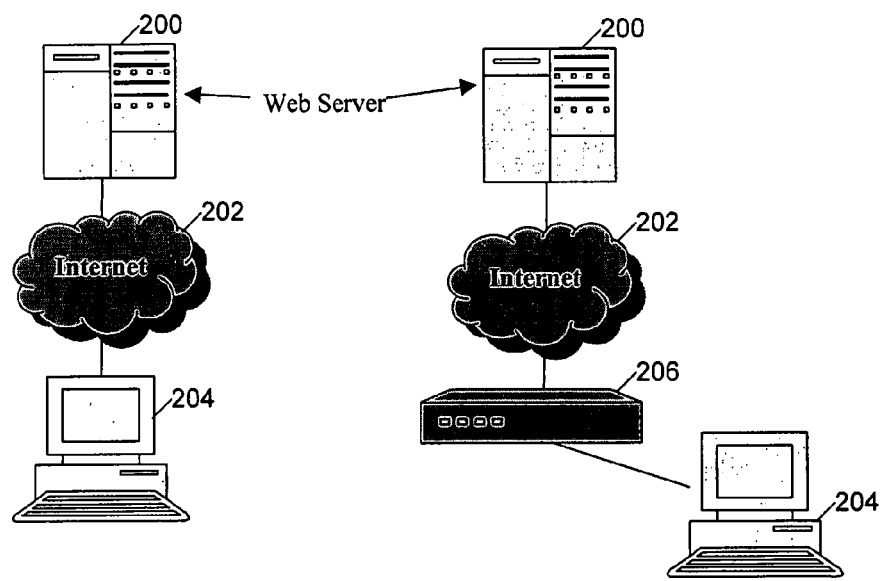
Figure 2a
(PRIOR ART)
Figure 2b
(PRIOR ART)

METHODS AND APPARATUS FOR ROUTING IN A NETWORK

CROSS-REFERENCE TO RELATED APPLICATIONS

This application is the U.S. National Phase under 35 U.S.C. §371 of International Application No. PCT/GB2005/000234, filed Jan. 24, 2005, designating the United States and published in English on Aug. 25, 2005, as WO 2005/079020, which claims priority to United Kingdom Application No. 0402739.7, filed Feb. 9, 2004, and to U.S. Provisional Patent Application No. 60/543,539, filed Feb. 12, 2004.

FIELD OF THE INVENTION

This invention generally relates to methods and apparatus for routing data in networks, in particular packet data routing in TCP/IP (Transmission Control Protocol/Internet Protocol). Applications of the invention include routing of peer-to-peer (P2P) network data.

DESCRIPTION OF RELATED ART

Broadly speaking a router is a device which operates at the network layer of the seven layer Open Systems Interconnect Model, forwarding and/or determining a path for packets of data from a sender to a receiver using underlying data link and physical layers to facilitate the transport of data from one entity to another. The most common network layer protocol is Internet Protocol (IP) under which data is transmitted in packets to which IP adds an IP header. The IP header is used to determine whether a packet is to be forwarded and to where in the network the packet should be routed, that is which output interface should be employed.

Generally a router comprises a processor with two or more network interfaces, the router receiving packets, stripping off link layer protocol headers, adding new LLP headers and then retransmitting the packets. Generally a router forwards packets from one IP network to another although in the systems that are described later traffic may also be routed within a single network.

At this point it is helpful to review some of the characteristics of IP networks, and also of some of the additional protocols which are commonly used over internet protocol.

An IP header of an IP data packet contains an IP source address, an IP destination address, checksum data, and other data such as time to live (TTL) data (comprising a number which is decremented by one each time the IP packet passes through a router, the data packet being discarded when the number reaches zero). A computer connected to the Internet has an internet or IP address, which is presently a 32 bit address arranged as four eight bit octets, for example 129.1.48.254. Internet Service Providers (ISPs) are generally allocated a range of internet addresses which they can allocate to users and an IP address may be allocated to a subscribing user either temporarily, for example on dial-up, or permanently. Where a user accesses the Internet using an ADSL (asymmetrical digital subscriber line) modem or other broadband or "always on" technology a permanent IP address is normally allocated. Internet resources such as web pages are located by means of uniform resource locators (URLs) which specify, among other things, a hostname of a computer on which the resource is stored. The URL is translated into an IP address by means of a domain name server or server tree.

A range of additional protocols are used over the internet protocol, the most common of which is Transmission Control Protocol (TCP). Other protocols running over IP include UDP (User Datagram Protocol), and RDP (Reliable Data Protocol)—a more complete list can be found in RFC 1700. The transmission control protocol breaks up data for communication over the Internet into a number of packets or datagrams, reassembles the datagrams in the correct order and performs error checking after transmission. The internet protocol is responsible for routing the individual datagrams. Like IP, TCP adds a header to each datagram including, among other things, source and destination port number data, sequence number data (for reassembling the datagrams) and a selection of flags. The flags include a Synchronize Sequence Numbers (SYN) flag which synchronizes sequence numbers to begin a connection, an Acknowledgement Field Significant (ACK) flag which, when set, indicates that the datagram includes acknowledgement data for confirming reception, and a Finish (FIN) flag which, which set, indicates that all the data has been sent. Depending upon the amount of data to be sent, one or more datagrams may be necessary. An IP data packet comprises an IP header in front of a TCP header, the TCP header being followed by the payload data of the packet. The header data may be thought of as signalling data associated with the payload data.

A TCP connection is established using a 3-way handshake as defined in RFC 793 (see, for example, section 3.4 and FIG. 7), the main purpose of which is to prevent old duplicate connections from causing confusion. Broadly speaking to open a connection a client C sends a server S a message with SYN set and a randomly chosen sequence number X; S then responds with SYN set, another random sequence number Y, ACK set, and an acknowledgement number X+1; C then replies with ACK set and acknowledgement number Y+1. If at some stage an old, duplicate or incorrect SYN arrives ACK is returned but with an incorrect field (ACK number) thus causing a reset (RST) which closes or aborts the connection. This mechanism is intended to deal with half-open connections (i.e. where one end is closed or aborted) but may be exploited in the systems described later to close or abort a connection if desired.

TCP/IP is used to provide services available over the Internet such as a File Transfer Protocol (FTP), a Network Terminal Protocol (TELNET), a Simple Mail Transfer Protocol (SMTP), and other protocols such as the HyperText Transfer Protocol (HTTP) which is used for providing Hypertext Markup Language (HTML) documents on the World Wide Web. These services are provided as client/server services, a server providing services for other computers coupled to the network.

When a connection is made to a computer specified by an IP address, a service may be requested by specifying a port. A number of port numbers are conventionally assigned to specific services—for example FTP uses ports 20 and 21, and HTTP uses port 80. On home computers, for example, port 139 provides NetBIOS session services for performing network operations on the computer. RFC 1700 provides a list of well known or assigned port numbers.

A connection is established between client and server processes using pairs of sockets, each socket having a socket address comprising an internet address and a TCP port number. Under TCP a server process socket listens for a connection request and a client requests a connection to the socket. Once two sockets have been connected data can be transmitted bidirectionally and transparently. This is known as stream communication; other protocols, such as UDP, use datagram communication in which the socket address of the receiving socket is sent in each datagram. Generally although one socket will have an assigned port number, the other socket of the connection will have a port number selected more or less at random from those port numbers which are not reserved (for example ports 1024 and upwards). As described further below, some P2P traffic employs fixed port numbers but other P2P traffic employs variable port numbers, to make it more difficult for routers to control (and normally limit) such traffic.

Routers are commonly configured to route TCP/IP data according to destination port number, that is in effect according to the requested service. This allows key services such as web access and e-mail to be given a higher priority than other services, for example P2P protocol data. In some networks, particularly University networks, P2P protocol data may comprise between one-half and two-thirds of the total data transported on the network, both because of the cascading search mechanisms search engines generally employ and because of the relatively large sizes of data files which are commonly transported over P2P networks, often comprising audio and/or video data.

Where a P2P protocol uses a fixed, known port number services (traffic) associated with this port number may be given a low priority, thus helping to manage such traffic. Throttling may also employed, buffering P2P data packets to delay them and thus reduce the effective speed of a P2P network, providing a reduced quality of service, and/or packets (window) size may be controlled to control the amount of data sent prior to an acknowledgement signal again, effectively, reducing network transmission speed for P2P data. However P2P protocols have evolved to evade such controlling action, and in particular some P2P protocols now employ a random or variable port for P2P connections, thus making traffic management using a conventional router difficult. It is known to block P2P traffic when this is identified but this is undesirable because whilst it may, for example, be acceptable block audio or video downloads there are significant applications for P2P networks, for example in the distribution of code and/or data which should not be blocked. One problem with routing P2P traffic when the destination port is not known is that although it is possible to identify such traffic by monitoring the contents of data packets passing through a router, by the time such traffic has been unambiguously identified as P2P a connection has already been established.

The example of a P2P network has been used as an illustration of the difficulties of routing data in the context of a network, generally a TCP/IP network, where a particular connection type or service is not uniquely associated with a corresponding destination, in the case of a TCP/IP network a destination port number. It will be appreciated, however, that this difficulty is not restricted to P2P protocols and in principle may occur with any type of service and associated protocol transported over a data network where there is a need to route data based upon content. For example similar problems may arise in the field of online computer gaming where non-standard ports are employed and there is a need to give the gaming traffic a lower priority than other traffic.

SUMMARY OF THE INVENTION

The present invention seeks to address difficulties of the type outlined above.

According to a first aspect of the present invention there is therefore provided a method of controlling traffic on a data network, said traffic comprising payload data and associated signalling data, the method comprising: reading a portion of said payload data for traffic of a communications session between a first entity and a second entity communicating over said network; determining whether said portion of payload data identifies a type of traffic to be controlled; storing signalling data associated with said portion of payload data; signalling, responsive to said determining, to at least one of said first and second entities to interrupt said communications session; reading signalling data for traffic on said network and comparing said read signalling data with said stored signalling data to identify further traffic of said controlled traffic type, for example, between said first and second entities; and controlling said further traffic responsive to said identification.

Broadly speaking the method identifies traffic to be controlled by reading the payload data rather than by relying upon the signalling data, in the case of TCP/IP a fixed socket address. Should the payload data identify the traffic as requiring control the signalling data associated with the communications session is stored and the communication is interrupted so that when it restarts traffic for the session can be routed as desired, for example directed towards a gateway or cache. The signalling data preferably comprises a destination address or identifier, for example a socket address, and preferably signalling data is only stored for traffic of a controlled type. In some embodiments the payload data may also be stored. This facilitates confirmation that a communications session comprises traffic of a controlled type as it allows both traffic sent by the first entity and traffic sent by the second entity to be checked, so guarding against the possibility of attack by a malicious first entity interfering with traffic for a second entity by sending traffic of a controlled type to an unsuspecting second entity.

Optionally, or conditionally on a protocol type of the traffic, the method may include signalling, responsive to said determining, to at least one of said first or second entities to interrupt said communications session. However other embodiments may simply control traffic of later established communications sessions between different entities.

Embodiments of the method allow TCP data to be routed by content thus facilitating, for example, the routing of P2P data which does not employ a fixed destination port. Preferably the method includes determining an address of an originator or client for the controlled type of traffic and a message or signal may then be sent to this originator or client to shut down the connection. The connection may be shut down at a relatively low level, using signalling data, or at a higher level using overlying protocol data. For example a message from the recipient (server) may be faked informing the client that the recipient (server) is busy and, optionally, requesting a retry. In other embodiments such a message may comprise, for example, an HTTP redirect message and in this way HTTP traffic employing a non-standard port may be controlled.

A determination of whether traffic is of a controlled type may be made by comparing a portion of payload data with a signature of the controlled type of traffic, for example by masking out variable data of a known protocol and then making a comparison of the payload data with allowed message formats within the protocol.

Preferably the network comprises a packet data network and the signalling data includes a destination identifier to identify a machine and/or programme or process. In a TCP/IP network the signalling data may comprise a header (or trailer) including a destination address and port number. In later described embodiments the type of traffic to be controlled comprises peer-to-peer protocol network traffic, either search or download traffic or both.

In another aspect the invention provides processor control code to, when running, control traffic on a data network, said traffic comprising payload data and associated signalling data, the code comprising: code to read a portion of said payload data for traffic of a communications session between a first entity and a second entity communicating over said network; code to determine whether said portion of payload data identifies a type of traffic to be controlled; code to store signalling data associated with said portion of payload data; code to read signalling data for traffic on said network and to compare said read signalling data with said stored signalling data to identify an attempt to begin a further communications session of said identified traffic type or to receive said communications session; and code to control traffic of said further or resumed communications session responsive to said identification.

The invention further provides a router for controlling traffic on a data network, said traffic comprising payload data and associated signalling data, the router comprising: a network interface for interfacing with said data network; a data memory operable to store data to be processed; an instruction memory storing processor implementable code; and a processor coupled to said network interface, to said data memory, and to said instruction memory and operable to process said data in accordance with code stored in said instruction memory, said stored code comprising: code to read a portion of said payload data for traffic of a communications session between a first entity and a second entity communicating over said network; code to determine whether said portion of payload data identifies a type of traffic to be controlled; code to store signalling data associated with said portion of payload data; code to read signalling data for traffic on said network and to compare said read signalling data with said stored signalling data to identify an attempt to begin a further communications session of said identified traffic type between said first and second entities or to receive said communications session; and code to control traffic of said further or resumed communications session responsive to said identification.

In another aspect the invention provides a carrier medium carrying computer readable code for a router for routing peer-to-peer traffic on an internet protocol (IP) packet data network, the router having a data table identifying peer-to-peer sockets, the code comprising code to: read payload data of a packet of data traffic; determine whether said payload data relates to a peer-to-peer protocol; write socket data for said payload data into said table responsive to said determining; and route packets of data traffic on said network responsive to said socket data in said data table.

The table preferably stores a list of known or identified peer-to-peer sockets but in other arrangements may store a list of destination addresses and port numbers for services known not to employ a peer-to-peer protocol.

The above described code may be incorporated into a router configured for routing traffic of a controlled type, in particular P2P traffic.

Embodiments of the above described methods may be implemented using computer program code, for example on a general purpose or dedicated computer system. Such program code, and the above described processor control code, may be provided on any conventional carrier medium, such as a hard or floppy disk, ROM or CD-ROM, or on an optical or electrical signal carrier for example via a communications network. The code may comprise code in any conventional programming language, for example C, or assembler or machine code. Such code may be distributed over a plurality of coupled components, for example over a network, as is well known to those skilled in the art. Likewise data processing and storage functions may be separated but linked, for example by a network. Embodiments of the invention may be implemented on a variety of communications network, but are particularly suited to implementation in a P2P network running over an IP-type protocol.

BRIEF DESCRIPTION OF THE DRAWINGS

These and other aspects of the present invention will now be further described by way of example only with reference to the accompanying figures in which:

FIGS. 1a, 1b and 1c show, respectively, an example of a centralised peer-to-peer network, an example of a decentralised peer-to-peer network, and steps illustrating location and retrieval of a file in a decentralised peer-to-peer network;

FIGS. 2a and 2b show a computer in contact with a remote web server directly and via a proxy cache respectively;

DETAILED DESCRIPTION OF PREFERRED EMBODIMENTS

As has previously mentioned it is helpful to consider the concrete example of a P2P network to illustrate the problems of routing data where a service is not associated with a unique destination port address. Emphasising, therefore, that the invention is not restricted to problems specific to P2P networks, it helpful to consider some of the features of a P2P network and to illustrate operation of an embodiment of the present invention in such a context.

Generally a peer-to-peer network comprises a plurality of nodes where each node represents a computer running a compatible peer-to-peer (P2P) client. Generally a node will operate as both a server and a client, and it may then be referred to as a servent (SERVer plus cliENT). Each node has a number of peers that it maintains direct connections to, the nodes or peers interacting as equals. A peer-to-peer network is sometimes referred to as an overlay network since it overlays an underlying physical network topology and may operate at a relatively high network layer, such as the application layer. Generally the topology of a P2P network bears little or no resemblance to the underlying physical network topology, as will be explained further below. Most often P2P networks are implemented over the Internet, although they may also may be implemented on other networks such as intranets and extranets.

Peer-to-peer networking has a variety of applications including distributed processing and file sharing. In file sharing P2P systems users or nodes may exchange data files or fragments of data files without the need for the files (or fragments) to be stored on a central server. This contrasts with worldwide web protocols in which web clients download data held on web servers which are named, and specified by a fixed internet protocol (IP) address. In a P2P network a data file may be found one, or more typically a plurality of nodes the addresses of which need not be fixed and may change over time as nodes add or remove files from their local storage. (It will be appreciated, however, that the IP address of any particular computer at a node may remain fixed). It will be recognised that the structure of P2P networks imposes special problems when searching for and downloading files.

Figure 1A:
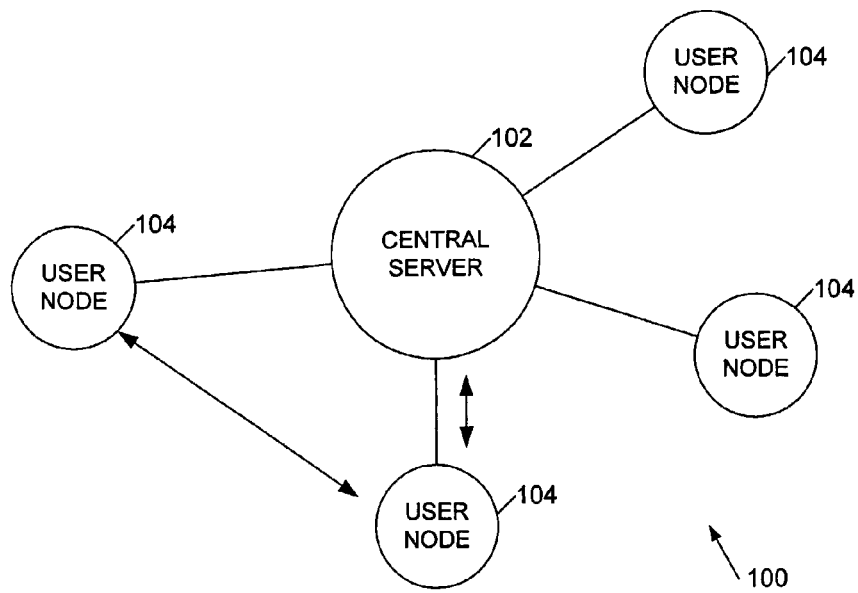
Figure 1B:
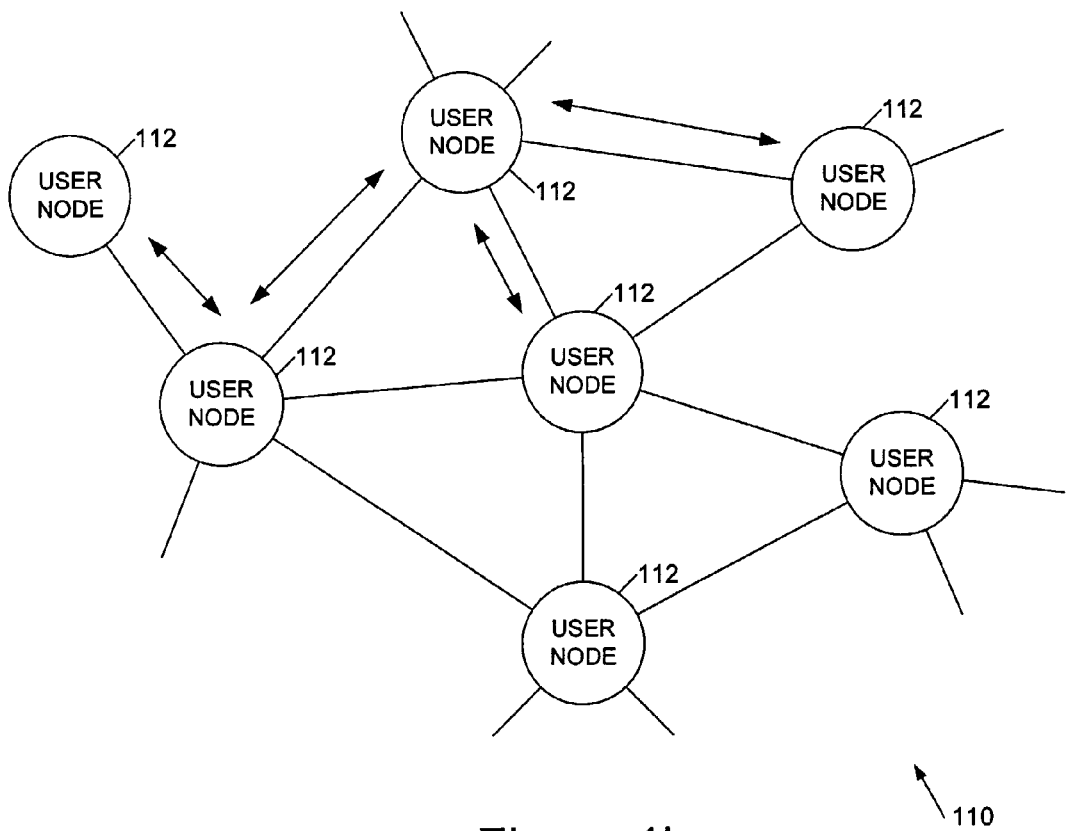

Peer-to-peer networks fall into two broad categories, centralised P2P networks 100 and decentralised P2P networks. FIG. 1a illustrates an example of a centralised P2P network and FIG. 1b illustrates an example of a decentralised P2P network 110. The centralised P2P network has one or more central servers 102 to which each user node 104 must connect. Central server 102 maintains a centralised index or directory of shared files, user nodes or peers 104 uploading lists of files which they are prepared to make available to this central index. This central index may be queried by a node 104 to locate a file, following which the file may be directly retrieved from a node which the central index shows has the file available. In a centralised P2P network a user must register with the central server 102, which has a fixed, known address. Thus in a centralised P2P network there is a restricted number of points of entry into the network, defined by these central servers. In P2P system 100 central server 102 maintains a list of users who are logged onto the network, lists of files shared at any given moment by a user, and IP addresses of clients logged onto the central server to search for shared files. A search result generally comprises a list of user names and IP addresses and of corresponding file names found by the central server 102.

By contrast in the decentralised P2P network 110 of FIG. 1b a user may join the network at any point and there is no requirement for registration with a single central server or with one of a few particular, designated central servers. Thus in FIG. 1b the user nodes 112, or peers, act as both clients and servers at the same time (servents) to allow a request for a resource such as a file to propagate through the network until a node or peer at which has the resource is found.

More sophisticated P2P networks may include "supernodes" or "ultrapeers" each with a plurality of "leaf" nodes; sometimes these are referred to as controlled decentralised P2P networks. Such supernodes may index content available from nodes in a nearby neighborhood, such as content available from the leaf nodes, as well as communicating among themselves, for example to satisfy queries. Supernodes may be fixed or dynamically selected, for example by defining an initial set of supernodes and then allowing nodes (peers) to vote amongst themselves to elect more. In terms of the searching process this is analogous to identifying well-connected people to ask first about the availability of a file or other resource.

The topology of a decentralised P2P network is not generally structured to be efficient in respect to the underlying physical network(s). File search requests or queries are generally broadcast from each node to all its neighbouring nodes, and query responses are sent back along the route defined by the chain of queried nodes. In both decentralised and centralised networks, however, once a file has been located a direct connection such as a socket connection (address and port number) is generally established between the node at which the file is available and the requesting node. A node may also initiate a plurality of connections to other nodes or peers to attempt a plurality of concurrent downloads, for example to use the fastest, or a node may download multiple fragments of a file, for example in parallel from multiple peer nodes.

Thus the traffic on P2P file sharing networks may be categorised into network traffic and download traffic, the network traffic comprising, for example, messages involved in maintaining the P2P network infrastructure together with search requests and the responses they generate. It will be appreciated from the foregoing that decentralised P2P networks are able to generate significant quantities of network traffic. Furthermore since many users of file sharing P2P networks use the network to share multimedia data downloaded file sizes and the download traffic is also usually large. Currently P2P file sharing networks are responsible for a significant proportion of data traffic on the Internet, and in particular on the networks of Internet Service Providers (ISPs) who provide internet connectivity to consumers over broadband connections. Typically P2P users generate around 50% of this traffic. There is a considerable cost associated with routing and relaying this information, which is one problem which the present invention addresses.

Referring to FIG. 1c, this shows six steps 120-130 illustrating the location and retrieval of a file in a decentralised P2P network. In this decentralised P2P network every P2P user is a node on the network and each node maintains a connection to a small number of other nodes, in this example two but more typically four. At step 120 node A issues a query 132 to nodes B and C which propagates at step 122 to nodes D, E, F and G. At step 124 node E sends a response or query hit 134 back to node B and thence, at step 126, back to node A. At step 128 node A then issues a file download for Get request 136 directly to node E which responds, at step 130, by sending the requested file 138 to node A.

As each node selects its peer nodes at random the "neighbouring" nodes of a peer may physically be on the other side of the world. A result of this is that each node in an ISP's network typically has a number of peers from all over the world and is constantly relaying large numbers of queries, and the corresponding query results. Application level and other P2P networks do not generally take into account geographical locations for usage costs associated with the underlying physical networks.

A typical P2P query has an associated time to live (TTL) which defines the number of network hops the query is permitted to make. At each hop from one network node to another the TTL counter is decremented until it reaches zero, when the query is no longer propagated. A typical initial value of the TTL counter is T=7 and if each node maintains connections to P (say 4) other nodes the total number of computers through which a query propagates is determined by $T^P$ and it can therefore be seen that P2P networks generate large quantities of network traffic.

Currently decentralised P2P systems include Gnutella (with applications such as Morpheus, Bearshare and Limewire), FastTrack (with applications such as KaZaA), the latest versions of which use the above described supernode concept; an example of a centralised P2P network is Napster. There are many uses for such P2P networks including the distribution of free software such as Linux code, the distribution of games, and instant messaging. Furthermore because the originator of a query or message is kept secret P2P networks can be useful in countries where freedom of speech is limited. However at least in some networks the bulk of P2P traffic comprises audio and video data files such as MP3 and AVI files and it has been found that the median object size for P2P networks is approximately 4 MB, that is approximately 1000 times the average web document size (2 KB) and that the average bandwidth consumption of a P2P peer is approximately 90 times that of a typical web client.

The caching of web content is an established technology that is widely used. With a web proxy cache, web requests (which use the Hyper-Text Transport Protocol or HTTP) get sent via a proxy rather than going directly to the server that hosts the content. This proxy can store (or "cache") the data it downloads so that if another user requests the same web page that the data can be sent from its local copy. Web proxy caches can reduce internet bandwidth usage and "speed up" access to the web. FIGS. 2a and 2b illustrate the principle of a web cache, in which a web server 200 communicates over the Internet 202 with a computer 204. In FIG. 2a computer 204 talks directly the remote web server 200 but in FIG. 2b computer 204 first communicates with a local proxy server 206 which may send back copies of the requested data that it has cached locally.

Theoretically P2P caching should potentially be highly beneficial but the distributed nature of a P2P network has led to the belief that the efficient caching in a P2P system is not possible. Traffic management within a P2P network has therefore focused on the relatively crude technique of limiting the time to live (TTL) of a P2P packet, although, one company, SandVine Inc of Waterloo, Ontario, Canada, offers a product (the PPE8200) which purports to lower network costs for peer-to-peer traffic by redirecting P2P downloads to hosts on a reduced cost path not withstanding this, the inventor's earlier UK Patent Application No. 0303192.9, filed on 12 Feb. 2003 in the name of Saviso Group Ltd, the contents of which are hereby incorporated in their entirety by reference, describes how P2P traffic control and caching may be achieved.

Broadly speaking this earlier patent application describes a method of reducing traffic in a decentralised peer-to-peer network, said peer-to-peer network operating over an underlying network comprising first and second network portions comprises routing a peer-to-peer message in one of said network portions with an intended destination in the other of said network portions to a gateway between peer-to-peer nodes residing on said first and second network portions; and controlling transport of said message at said gateway to limit propagation of said message into said other of said network portions.

The gateway resides at the boundary of a service providers network to facilitate control of traffic from the one network portion that is, for example, the first network portion managed by, say, an ISP and the other network portion, in this example the second network portion, comprising, say, the rest of the world. By routing peer-to-peer messages, preferably all peer-to-peer messages intended for the other network portion, via the gateway a range of transport control and traffic reduction functions become possible. For example propagation of a message into the second network portion may be prevented either by ignoring the message or redirecting the message or, as described further below, responding to the message from a cache. The message controlled at the gateway may comprise a query message or additionally or alternatively propagation of a request for a resource made in response to the result of a query message (for example, in response to a query hit) may be limited, for example by controlling a subsequent file download or GET request. The routing may be performed by configuring a router to transparently route all outgoing and potentially also all incoming P2P traffic via the gateway. Thus the first and second network portions may comprise, for example, portions of an underlying physical or logical network or domains of an IP-based internet.

The concept of a gateway node allows the number of peer-to-peer connections across a boundary between the first and second network portions to be limited, thus controlling the bandwidth across the boundary and hence also facilitating control of data transport costs. Furthermore since in preferred embodiments all P2P traffic is routed via the gateway node this node may act as a cache (for inbound and/or outbound traffic) and/or router and/or bandwidth throttle and/or content filter. Thus, for example, unsuitable or illegal content may be blocked at the gateway or messages may be blocked to limit or throttle the traffic between the first and second network portions. A message may also be redirected to a peer-to-peer node known to the gateway within its network portion. Additionally or alternatively the gateway may respond to the message. Preferably, therefore, the gateway comprises an active peer-to-peer node of the peer-to-peer network.

A query hit or search result message passing through the gateway may be rewritten en route so that the requesting node requests a file from a node different from that which responded positively to the search request. Such rewriting may comprise rewriting an index to a file within the search result or query hit or additionally or alternatively the response may be rewritten to disguise the address to which the response originated or to substitute an address, for example, an address of the gateway node, for an address in the response. In the preferred embodiment the gateway comprises a cache for caching responses to queries and/or files requested in file requests. In this way search and/or download traffic may be reduced; preferably both search and download data is cached. It will be appreciated that the concept of a gateway node facilitates such caching. Preferably data is cached with a time stamp to allow the data to be discarded after expiry of a period of time. The skilled person will appreciate that since in some P2P networks downloading of partial files or fragments is permitted, a file cache may store such file fragments and these may then be retrieved and served to a requesting node in accordance with the P2P protocol.

Caching in a P2P network presents particular problems associated with the very large volume of data transferred. However since that much of the traffic on a P2P network comprises multiple replications of the same files, although not necessarily with the same file name. This recognition has led a content identifier such as a hash function may be associated with each file and/or file requests cached. As the skilled person will know, a hash value represents concisely the longer message or file from which it was computed, and is thus able to serve an identifier of content irrespective of file name. Thus in a preferred arrangement such a hash function, sometimes known as a message digest or checksum is used as an index into the cache. Where the cache stores search responses or query hits, these preferably include a hash value to facilitate their recall, and where a query hit is rewritten, preferably it is rewritten with such a hash value. Likewise where file data is cached this is preferably cached in association with a hash value to facilitate its identification irrespective of a requested filename. Such a hash value may also be used to retrieve additional file or data source-related information from a cache. In this way, duplicate files, that is files with the same contents but, for example, with different names and/or from different networks that these need only be stored once in the cache. Identification of duplicate files may be performed such that duplicate files are not stored or additionally or alternatively duplicate files may be weeded from the cache at intervals.

In some P2P networks messages have a "unique" identifier and in such networks the gateway may operate to limit propagation of a message between the first and second network portion, each message is only ever relayed once across an ISP boundary. Tracking P2P messages in this way also facilitates selective routing of messages based upon the cost of the underlying physical network, and similarly facilitates satisfying download requests the cost of data transport (monetary, bandwidth or other) over any network portion.

To further illustrate the operation of P2P networks it is helpful to consider one such protocol in more detail. This is discussed below, merely to provide an illustration of an example of a P2P protocol and hence aid the understanding of one context in which embodiments of the invention may operate. However other embodiments of the invention, as described later, may operate in other contexts, such as other P2P protocols, or entirely outside the context a P2P network. For the purposes of illustration the Gnutella Protocol will be employed.

Figure 3A:
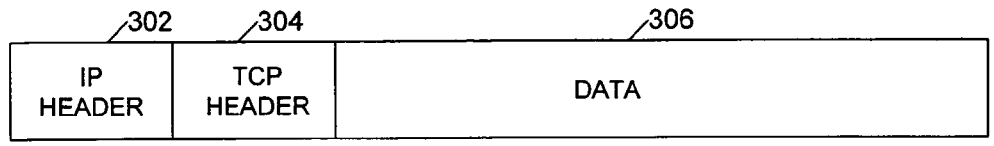
FIGS. 3a to 3e show, respectively, a TCP/IP data packet, a P2P message header, a P2P pong message, a P2P query message, and a P2P query hit message.
Figure 3B:

FIG. 3a shows a conventional TCP/IP (transmission control/internet protocol) data packet 300 comprising an IP header 102 (including IP source and destination addresses), a TCP header 304 (including, among other data, source and destination port numbers) and payload data 306. In Gnutella, to connect to a P2P network a node operating as a client establishes a TCP connection with a server (servent) and sends a connection request which the server acknowledges. Once a connection is established the two P2P nodes then communicate with each other by exchanging messages, sometimes called (protocol) descriptors. These P2P messages or descriptors each have a header 310 as shown in FIG. 3b comprising a node/message identifier 312, a message function 314, a time to live (TTL) counter 316, a hop count 318 and a payload length field 319. The node/message identifier may comprise a combination of a node identifier and a counter value to create a unique message identifier which can be used, for example, to prevent propagation of duplicate messages arising from loops in the system topology. The message function 314 specifies the message type (Ping, Pong and the like); the hop counter 318 is incremented at each network hop from one peer to another and the TTL counter 316 is correspondingly decremented by one; the payload length assigns the length of the accompanying P2P message.

Figure 3C:
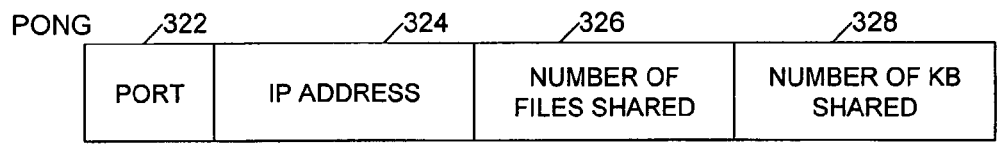
Figure 3D:
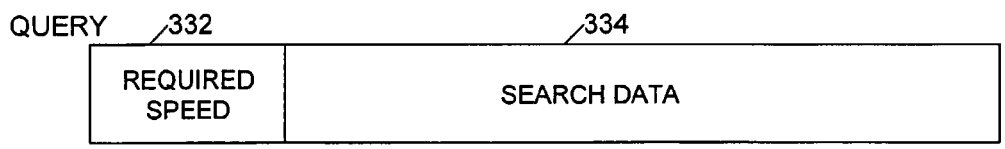
Figure 3E:
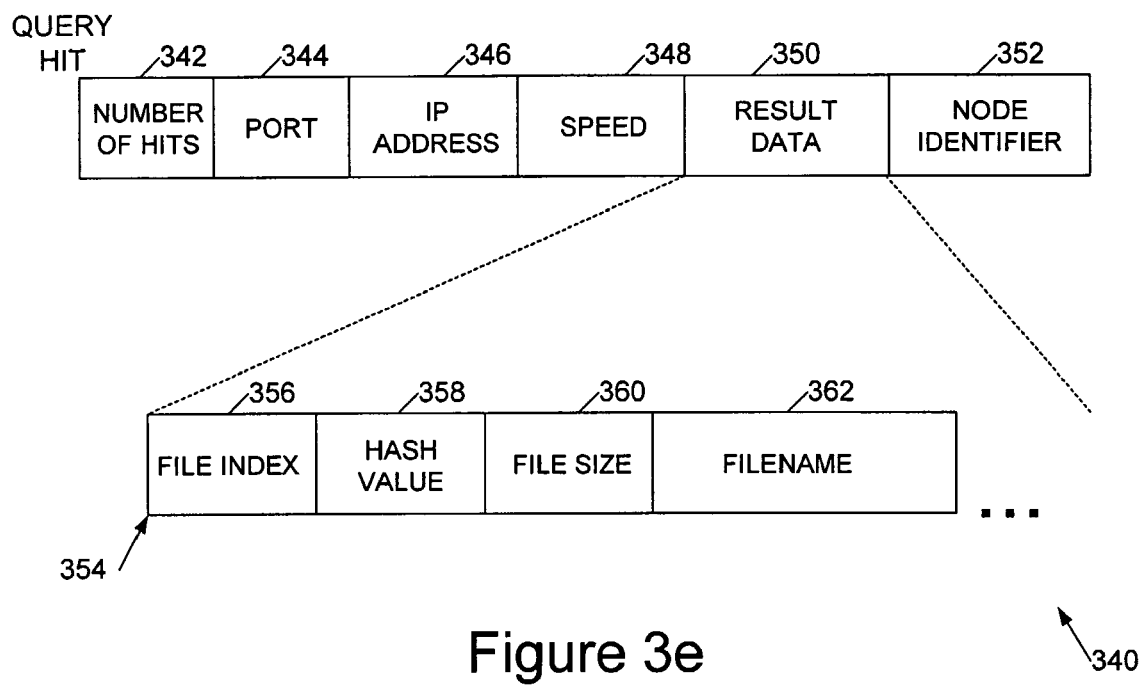

A Ping message (of zero payload length, not shown in FIG. 3) may be used for probing the network and the response to a Ping message is a Pong message 320 as shown in FIG. 3c. A Pong message includes a port number 322 and an IP address 324 (those are identified by their IP addresses), together with a field 326 specifying the number of files shared by the node, and a field 328 specifying the number of kilobytes of data shared by the node. Other messages include a query message 330 as shown in FIG. 3d comprising a minimum required speed field 332 and a field 334 carrying search data. The response to a query is a query hit message 340 as shown in FIG. 3e. A query hit message comprises a number of hits field 342, port and IP address fields 344, 346, a (download) speed field 348, result data 350 and a node or servent identifier 352 (such as an IP address). The result data comprises a set of results each having a format 354 comprising a file index 356, a file hash value 358, a file size 360 and a file name 362. The file index 356 is a number which can be used to index a file shared by a node; the hash value 358 is optional.

For Ping and Query messages a node propagates a message to all the nodes to which it is directly connected except the originator of the message, that is ping and query messages are broadcast to all neighbours. Pong and query hit messages are sent back along the same path as that which carried the initial associated message (ping or query).

A node does not propagate a message with an identical identifier to a message it has previously received. When a message is propagated a node decrements TTL field and increments the hop count. Once a file has been located it is downloaded using the HTTP (Hyper Text Transfer Protocol) GET command. Thus a query hit includes an IP address and port as well as an index and file size and file name the GET command can be used to request the selected file, indicating the index and file name and a http version number such as version 1.0.

An example of a P2P session is given below:

| | |
|---|---|
| Client: | QUERY "Madonna American Pie" |
| Server: | QUERYHIT IP Address |
| | MADONNA - AMERICANPIE.MP3, <INDEX>,<HASH> |
| Client: | GET /get/<INDEX>/ MADONNA - AMERICANPIE.MP3 HTTP/1.0 |

Figures 4A, 4B:
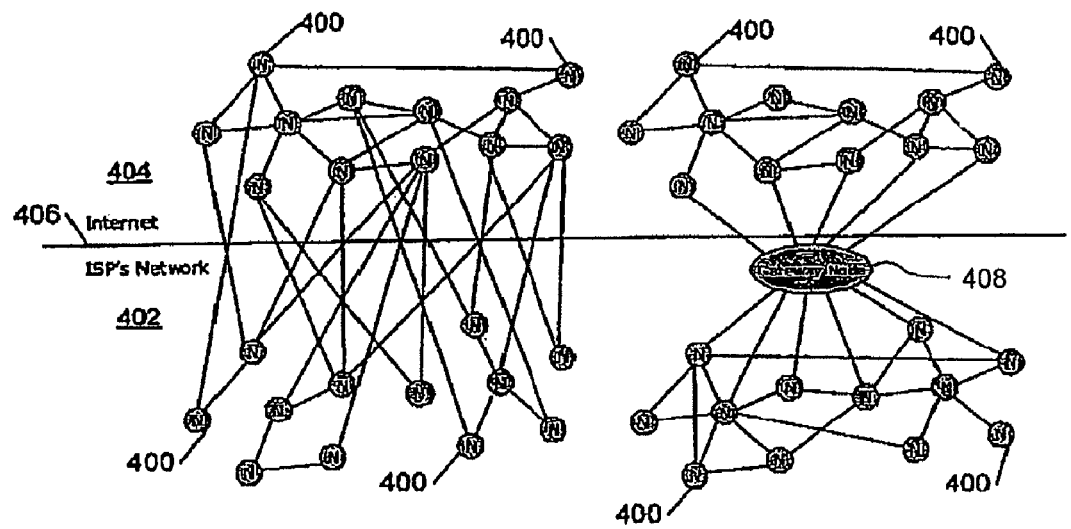
FIGS. 4a to 4c show, respectively, a P2P network, a P2P network including a gateway node, and an implementation of a gateway node.

FIGS. 4a and 4b illustrate the concept of a gateway node. FIG. 4a shows a peer-to-peer network with a plurality of nodes 400 some of which are within a network 402 managed by a service provider, and others of which are located elsewhere in the Internet 404. It can be seen that nodes within the ISP's network each have a number of peers in the outside world which results in a large number of connections (shown as lines in FIG. 4a) across the boundary 406 of the ISP's network. Since every packet which crosses boundary 406 costs the ISP money this results in high network costs. Moreover, the large number of connections lead to an untidy topology which is difficult for the ISP to manage.

The effect of introducing a gateway node 408 comprising an active node on the network which acts as a gatekeeper at the edge of the ISP's network 402. All P2P requests are routed through gateway node 408 and attempts to connect to nodes outside the ISP's network results in connections to the gateway node. This facilitates a high level of interconnectivity within the ISP's network and a small number of fixed connections, for example eight, crossing the expensive ISP boundary 406. Since all traffic is routed through the gateway node 408 this node can form the function of a cache router, a bandwidth throttle, and a content filter. The gateway node 408 monitors and routes P2P traffic transparently and also stores information relating to P2P queries and the associated responses (query hits) in a database. In preferred embodiments queried hits are also rewritten so that they refer (directly or indirectly) to indexes of files on the gateway node. The destination port number and internet address of a query hit may also be rewritten to point to the gateway node. Since the gateway node stores the results of past searches it may itself respond to search queries based upon these stored results. The gateway node 408 may also store contents (files) indexed based upon a key or checksum. A file checksum from a query hit packet may be used to access the database for a subsequent P2P download.

With a gateway node, data transfer over an ISP's boundary may be reduced by employing a small fixed number of connections (typically 8) independent of the number of users on the network. As well as reducing the amount of traffic being relayed the gateway node may also store data based upon the search traffic and responses that it sees. This enables it to build up a database of the locations of files on the network. This information may then be used for intelligent routing and caching of subsequent download requests.

Figure 4C:
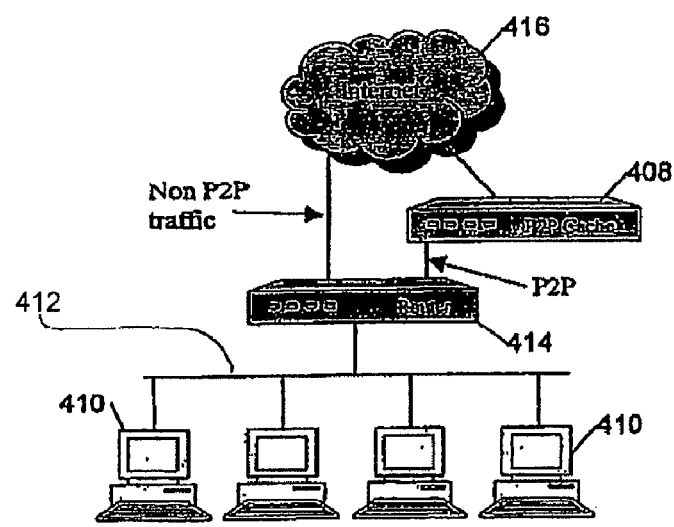

Referring now to FIG. 4c, this illustrates one implementation of a gateway node 408 comprising, in this example, a P2P caching router. As described further below such a P2P caching router may comprise conventional computer hardware coupled with routing hardware and suitable program codes. In FIG. 4c a plurality of computers 410, typically personal computers are coupled via a network 412 to a router 414, network 412 and router 414 typically comprising part of an ISP's network infrastructure. Non P2P traffic from router 414 is routed directly to internet 416 whilst P2P traffic is routed to P2P caching router 408 and thence to internet 416. This allows the ISP to reduce the level of network traffic on the network managed by the ISP and more particularly to reduce amount of "upstream" bandwidth required by the ISP, that is bandwidth to the Internet external to the ISP. The gateway node 408 preferably caches both network and download traffic and may cache one or both of inbound and outbound traffic (forward and reverse) caching. Router 414 may be configured to recognise P2P traffic based upon, for example, the destinations/ports by looking at or snooping packet contents.

Figure 5A:
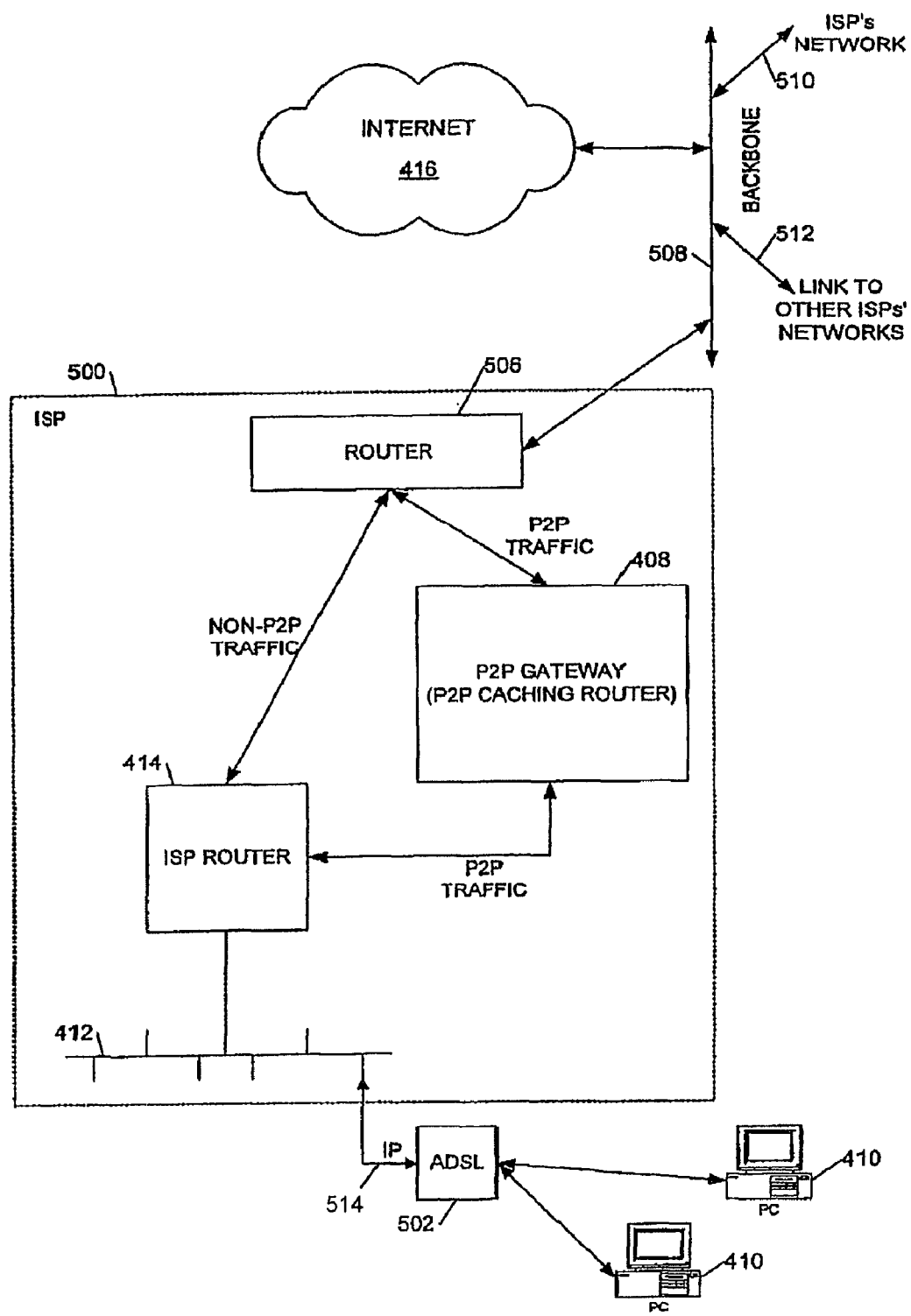
FIGS. 5a and 5b show, respectively, an example of an internet service provider network including a P2P gateway, and a modification of this network employing a router according to an embodiment of an aspect of the present invention.

Referring now to FIG. 5a, this shows further details of the arrangement of FIG. 4c, and like elements are indicated by like referencing numerals. Thus in FIG. 5a PCs 410 are coupled to an ADSL (Asymmetric Digital Subscriber Line) or cable modem 502 with an IP backbone connection 514 to a network 412 managed by ISP 500 but typically operating over physical network hardware provided by a telephone or cable company. The ISP router 414 and P2P gateway 408 are, in the example shown coupled to a common router 506 which connects the ISP to a backbone or core network 508 again, for example, provided by a cable company. Router 506 may separate incoming P2P traffic for gateway 408 in a similar way to that in which router 414 handles outgoing P2P traffic or, alternatively, both incoming and outgoing P2P traffic may be identified by router 414 and sent via gateway 408. Backbone 508 may provide a link to other portions of the ISP's network, as well as one or more links 512 to the networks of other internet service providers; generally backbone 508 will also include a high bandwidth connection into the Internet 416.

The ISP router 414 (and/or router 506) may identify P2P traffic in a number of ways. For example the Gnutella protocol comprises http traffic sent to ports 6346 and 6347, whilst KaZaa, which uses FastTrack, comprises HTTP traffic sent to ports 1214 (although version 2.0 of KaZaa selects a random port for incoming P2P connection). The destination port of a P2P message may be read from the message (see, for example, fields 322 of the Pong message shown in FIG. 3c). Where this is no fixed port for a P2P message a P2P packet may potentially be identified by reading the payload of a packet, for example to identify a P2P header or other P2P-protocol format data.

As previously mentioned, however, there is a difficulty in that once sufficient data from the payloads of packets of a data communication session has been read to confirm the session as P2P protocol it is generally too late to re-route the connection, for example to a local cache.

Figure 5B:
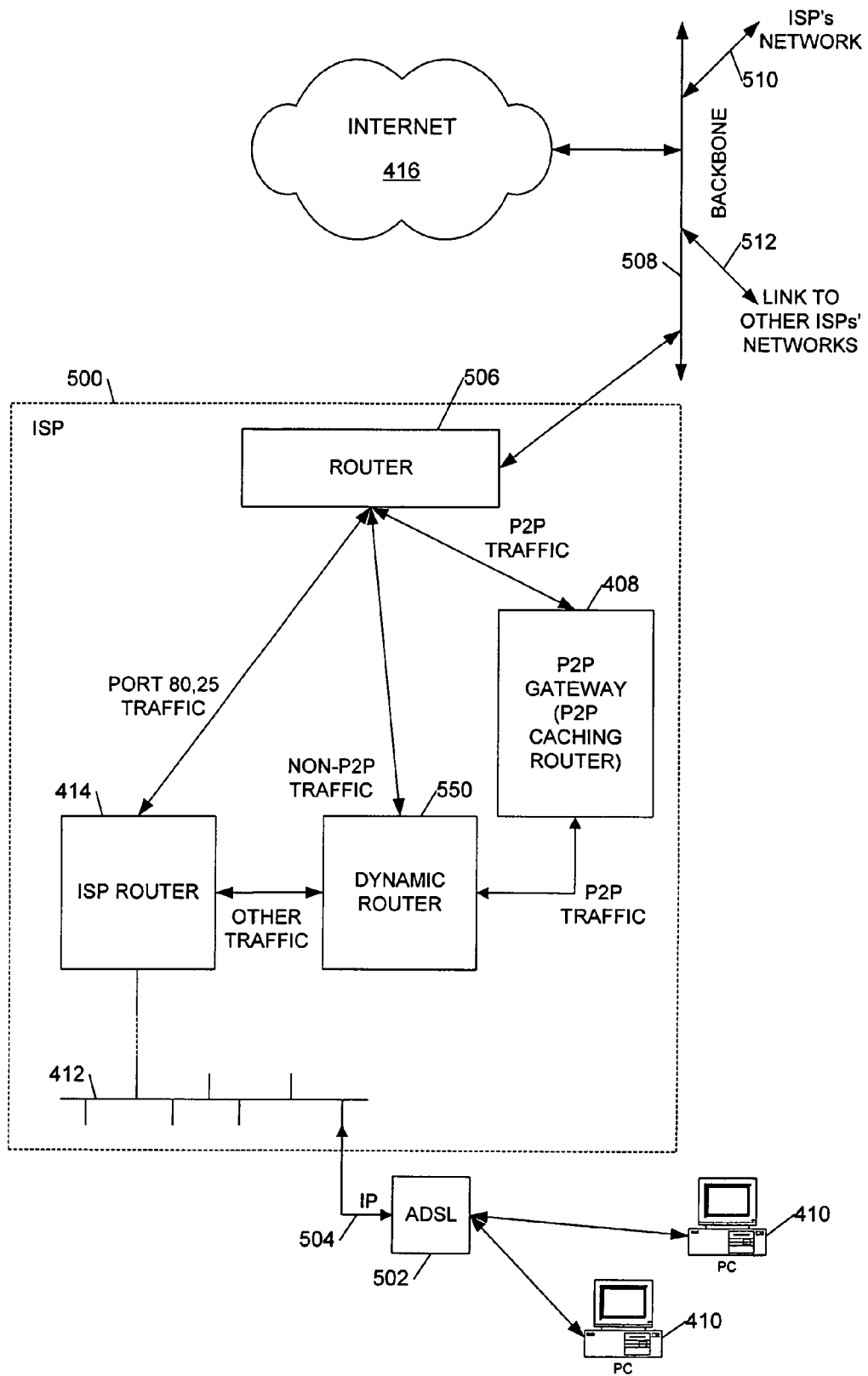

FIG. 5b shows a modification to the system of FIG. 5a including a direct router 550 for identifying and routing P2P traffic when such traffic is not associated with a fixed TCP/IP socket address, that is with a fixed destination address and port number. In the arrangement of FIG. 5b ISP router 414 separates traffic for key services such HTTP web access and e-mail (ports 80 and 25) from the rest of the traffic through the router, these key services being provided directly to router 506 to reduce any risk of their disruption. The remaining traffic is provided to dynamic router 550 which separates this into P2P and non-P2P traffic, the non-P2P traffic also being directed to router 506, and the P2P traffic being directed to P2P gateway/cache 408. As will be described further below, dynamic router identifies P2P traffic where this is not associated with a fixed socket address by reading the traffic and determining whether it confirms to one or more known P2P protocols.

Figure 6:
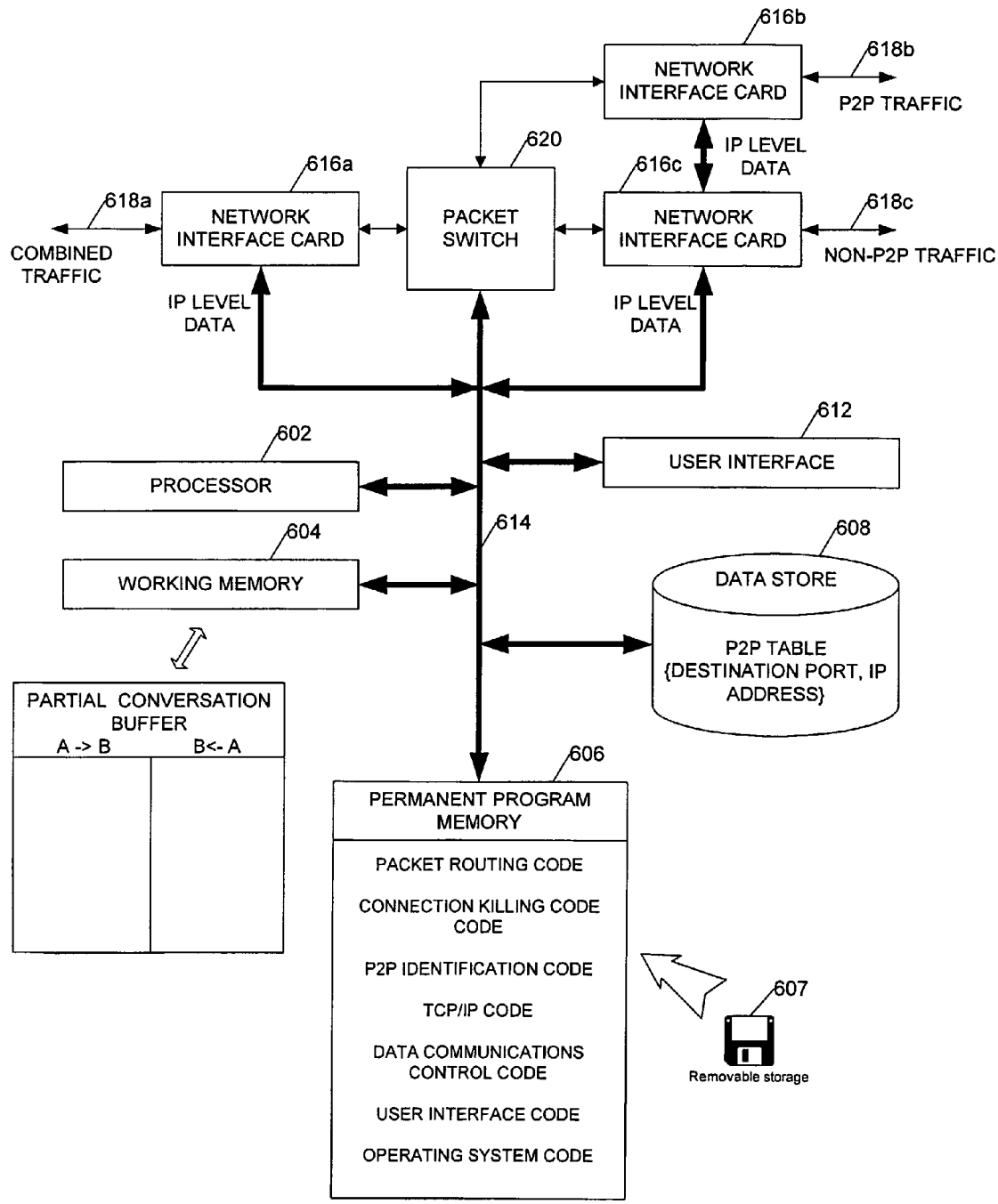
FIG. 6 shows a schematic block diagram of the router of FIG. 5b.

FIG. 6 shows a schematic block diagram of one embodiment of the dynamic router 550 of FIG. 5. Broadly speaking router 550 comprises a conventional router controlled by a suitably programmed general purpose processor 602. Thus router 550 comprises processor 602, working memory 604, permanent program memory 606, and a data store 608 all linked by a common data and controller 614. An (optional) user interface 612 is also provided for configuring the router. The router 550 also includes three physical data communications interfaces comprising network interface cards 616a, b, c also all linked to BUS 614 to communicate at the (TCP/)IP level with processor 602. Each network card provides a corresponding network interface 618a, b, c or, respectively, combined P2P and non-P2P traffic, P2P traffic, and non-P2P traffic. Each of network interface cards 616 is also coupled to a packet switch 620 which facilitates movements of data packets from one interface to another. As the skilled person will understand a router may include more network interfaces than just the illustrated three.

Permanent program memory 606 stores operating system code comprising (optional) user interface code, data communications control code for controlling the network interface card, TCP/IP code, P2P protocol identification code, P2P and/or TCP connection killing code, and packet routing code. This code, which is described further below, is loaded and implemented by processor 602 to provide corresponding functions for router 550. Some or all of this code may be provided on a carrier medium, illustratively shown by removable storage medium 607, for example a CD-ROM.

Data store 608 stores P2P table data such as a list of known P2P sockets each comprising a destination port at an IP address and/or a list of sockets known not to be used for P2P protocol data. Working memory 604 provides a buffer for storing fragments of data exchanges between entities making connections through router 550; such communication fragments (which are referred to later as conversation fragments) may be obtained by reading part or all the payload data of packets passing through the router. The buffer is divided into two parts, one for storing communications sent from a first entity A to a second entity B, and the corresponding part for storing communications sent from B to A. In embodiments the entries are indexed by connection identifiers comprising a source IP address and port and a destination IP address and port. The memory space allocated to each communication or conversation fragment may be relatively small, for example 16 bytes each way (32 bytes total) provided that this is sufficient to substantially unambiguously identify one or more P2P protocols the traffic of which it is desired to control.

For non-P2P traffic the router operates conventionally. Such conventional operation will be well known to the skilled person but to aid understanding the invention some basic features will be briefly outlined. Incoming data packets are typically received from a conducting or fibre optic cable although a wireless physical interface can also be employed. These received data packets are processed by a link layer protocol controller such as an Ethernet controller which provides some basic error checking and strips off link layer header data, and the packets are then placed in a queue. The IP headers of packets in the queue are read and the router then determines which interface to forward or route the packets to, adding a new link layer protocol header based upon the hardware address of the next intended destination of the packet, for example using an Address Resolution Protocol to determine a MAC (Media Access Control) address of, in the example of FIG. 5b, router 506 for P2P gateway/cache 408. The packet is then sent on its way to the next hardware device on enroute to the destination specified in the IP header.

A routing procedure for routing data corresponding to a service without a fixed socket address will next be described by reference to the example of variable destination port P2P protocol data. Broadly speaking the router operates to read fragments of "conversation" (that is payload data for communications) between two entities and if the "conversation" employs data conforming to a protocol traffic for which it is desired to control, in this case P2P protocol data, the router interrupts the connection and waits for one or other of the entities to attempt to re-establish the same or another similar connection. In the meantime the router has stored the socket address used for the communication so that when the communication restarts the router can identify and route data packets or the connection using the now known socket address in a conventional manner. Broadly speaking in a preferred embodimentation a buffer is provided which stores part of the communication between the first and second entities and this buffer is allowed to fill up until either traffic is identified as P2P (or other) protocol traffic or until the buffer is full. This in effect provides a mechanism for routing TCP/IP data based upon its contents, and based upon the recognition that the great majority of protocols will attempt to re-establish a connection that is broken. A table stores an identifier of the far end of the connection which is killed so that when the link restarts it can be identified and routed, for example to a cache. Where the option is available it can be preferable to break the connection in such a way as to encourage a retry, for example by sending a retry message back to the client making the connection, thus limiting user disruption and user level latency.

Figure 7:
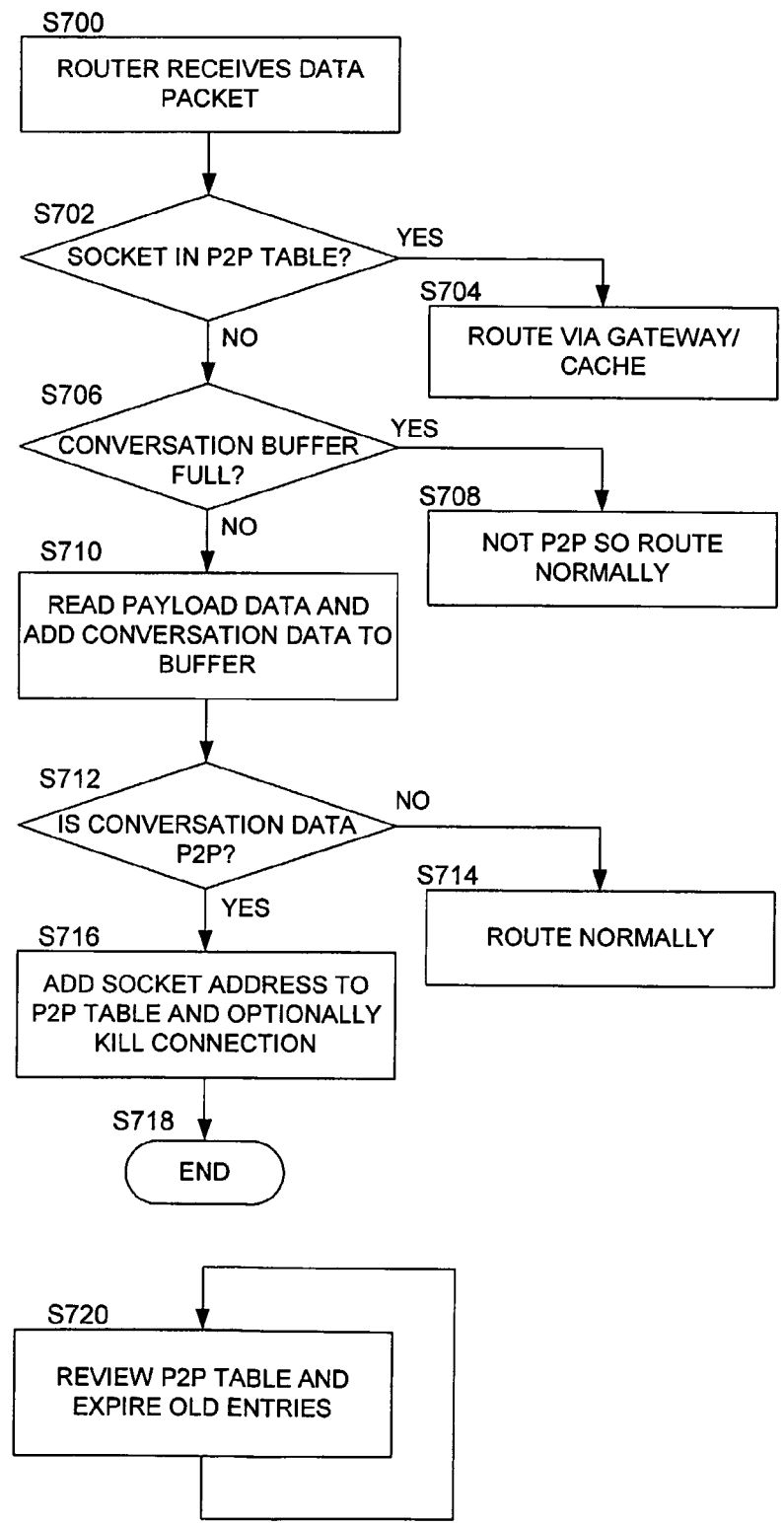
FIG. 7 shows a flow diagram of a software process for the router of FIG. 5b.

Thus, referring to FIG. 7, at step S700 router 550 receives an incoming data packet and, at step S702 checks whether the socket address (that is destination port and IP address), for the packet is in the P2P table in data store 608. If the socket address is in the P2P table then the packet is treated as P2P traffic and, in this example, routed via P2P gateway/cache 408. If the socket address is not in the P2P table the system checks, at step S706 whether the "conversation" or payload data buffer in working memory 604 is full for the entry indexed by a connection identifier for the packet, here the source and destination ports and IP addresses. If the buffer entries for the connection are full this implies that the traffic has not been identified as P2P traffic and so, at step S708 the traffic is routed normally. If, however, there is still "conversation" data to be collected for the connection it may be that not enough data has been collected to identify the connection as a P2P connection and thus, at step S710, the router reads some or all of the payload data for the packet, for example the first 16 bytes of the payload, and adds this data into the buffer. Then at step S712, the router checks whether the data stored in the buffer conforms to a known P2P (or other) protocol. This may be done just by checking data sent from a client process to a purported P2P server process the client wishes to connect to, but this allows the possibility of malicious attacks. For example an attacker could send P2P protocol data to a non-P2P server in order to disrupt non-P2P traffic to the server. It is therefore preferable that the buffer stores two portions of communication between a client process and a server process, a P2P protocol request from the client and a P2P protocol response from the server (here both "client" and "server" are used functionally since both processors may provide both functions depending upon the implementation).

Thus at step S712 the router preferably examines traffic from both the client process and the server process to determine whether a connection is being employed for P2P protocol data. A determination of whether payload data comprises P2P typical data may be made by, in effect, masking out variable portions of data in a protocol and then comparing the data to one or more known allowed message formats which (preferably) serve as a signature for the P2P protocol (or protocols) it is desired to control.

If at step S712 the data is not of the desired (P2P type the data is routed normally (step S714). However if an identification has been made that the data is P2P data then, at step 716, the socket address (destination port and IP address) for the data packet is stored in the P2P table in data store 608 and optionally or conditionally the connection is shut down. There is a number of ways a connection may be shut down. For example at the TCP level a SYN signal may be sent to either the client or the server to close the connection. Additionally or alternatively the router may send a (P2P protocol level message to one of the client and the server purporting to come from the other entity to close the connection. For example a "busy" message may be sent, optionally with a further message to encourage the recipient to attempt to re-establish the connection. However since not all protocols easily restart once they have been interrupted the interruption of a connection is optional, or may be made conditional, for example on the protocol being of a type which can re-establish the connection. The procedure then ends at step S718.

When, subsequently, a further data packet according to the protocol is received by the router the socket address for the connection will now be in the P2P table so that, at step S702, the data packet is routed in a desired direction, in this example via a P2P gateway/cache. The further data packet may comprise a data packet sent from an entity in an attempt to re-establish an interrupted connection or it may comprise a data packet from another entity attempting, say, to establish a connection and using a controlled P2P protocol. Preferably an additional loop, S720, reviews the P2P table at intervals and expires old entries, making them available for reassignment since generally an entry will only remain valid for a limited period of time because the destination port (for the service) is not fixed.

The above described techniques may be employed with search and/or download P2P traffic, between peer nodes or a peer and a supernode. Examples of P2P protocols to which the technique may be applied include Gnutella, Edonkey, and FastTrack. An example of a FastTrack data exchange is given below (where C refers to a client process and S to a server process):

```
C → S:   GET ./hash = xxxxxxxxxxxxxxxx HTTP/1.1 <OTHER DATA>
S → C:   HTTP/1.0 200 OK DATA ...
or:
S → C:   HTTP/1.0 5O3 Server Busy (X-FastTrack - Extension: Retry
         in 1 sec)
```

The initial message from the client to the server forms, in effect, a signature for the FastTrack P2P protocol. The reply from the server to the client is a more generic response and may comprise either of the illustrated messages. The third message is an example of a message which purports to be sent by the server to the client but is in fact sent by router 550, in embodiments of the technique, and closes the P2P connection. Substantially all P2P protocols will automatically retry in a few seconds but by adding the extension "retry in 1 second" disruption to a user's perceived level of service is limited.

Generally it is one of the initial messages which provides a signature for the protocol. For example the Gnutella connect message (which includes 'Gnetulla') may be employed for a signature; for other protocols more complex binary patterns and/or masks may be employed.

The skilled person will recognise that the above described techniques may be employed for routing or redirecting other types of traffic based upon content. For example a web cache and/or content filter may be provided for protocols employing a non-standard web port (that is a port other than port 80). In this case a connection may be effectively killed by sending an HTTP redirection message (status code 3XX). For example status code 302 Found normally employed where a requested resource resides temporarily under a different uniform resource indicator, may be employed to redirect a non-standard HTTP request to a cache or filter, for example on a proxy server.

In the main reference has been made to use of the TCP protocol but similar principles to those described above also apply to other protocols such as UDP and RDP where a retry is implemented at some level, for example using a higher level protocol. The routing or redirection control software has been described in the context of a router coupled to the internet but similar software may also be implemented on a general purpose computer coupled to the internet via a local or wide area network and gateway. Implementation of the software is not restricted to any particular operating system environment such as Windows, Linox, or Unix, nor any particular type of processor. Applications of the invention are not limited to the internet and may include other IP networks such as an intranet or extranet, and non-IP networks. For example the underlying idea of content-based routing in the context of a retry-implementing protocol may be employed with 2.5 G and 3 G web-enabled mobile phones and with PDAs (personal digital assistants) as well as in other types of network such as Bluetooth (trademark) networks where devices on the network have destination identifiers.

No doubt many other effective alternatives will occur to the skilled person and it will be understood that the invention is not limited to the described embodiments and encompasses modifications apparent to those skilled in the art lying within the spirit and scope of the claims appended hereto.

What is claimed is:

1. A method of controlling traffic on a data network, said traffic comprising payload data and associated signaling data, the method comprising:

reading a portion of said payload data for a first traffic of a first communications session between a first entity and a second entity communicating over said data network;

using a signature in the portion of the payload data to determine whether said portion of the payload data identifies peer-to-peer (P2P) traffic;

storing signaling data associated with said portion of the payload data;

reading signaling data for a second traffic of a second communications session on said data network;

comparing said read signaling data with said stored signaling data to identify said second traffic as the P2P traffic and controlling said second communications session responsive to said identification of the P2P traffic, by limiting propagation of the P2P traffic without limiting propagation of non-P2P traffic.

2. The method of claim 1, wherein said controlling further comprises:

controlling a route of said second communications session traffic.

3. The method of claim 1, further comprising:

reading at least a portion of said signaling data for said second traffic;

determining from said signaling data an address of an originator of said second communications session, said originator comprising one of said first and second entities; and sending a signal to said originator using said determined address.

4. The method of claim 1, wherein said controlling further comprises:

signaling with said signaling data.

5. The method of claim 1, wherein said controlling further comprises:

sending a message in said payload data.

6. The method of claim 5, wherein said message includes a request to retry establishing said second communications session.

7. The method of claim 1, wherein said storing is responsive to said determining.

8. The method of claim 1, wherein said reading of the portion of said payload data for the first traffic further comprises:

reading first payload data for a communication from said first to said second entity and second payload data for a communication from said second to said first entity, and wherein said determining whether said portion of payload data identifies the P2P traffic; and determines whether both said first and said second payload data contain the P2P traffic.

9. The method of claim 8, further comprising buffering said first and second payload data for said determining.

10. The method of claim 1, further comprising:

signaling, responsive to said determining, to at least one of said first and second entities to interrupt said communications session.

11. The method of claim 1, wherein said second traffic comprises an attempt to begin a further communications session of the P2P traffic or to resume said communications session, and wherein said controlling further comprises:

controlling traffic of said second communications session.

12. The method of claim 1, wherein said network comprises a packet data network and wherein said signaling data includes a destination identifier.

13. The method of claim 12, wherein said network comprises an internet protocol (IP) network and wherein said signaling data includes a destination address and port number.

14. The method of claim 1, wherein said traffic content type to be controlled includes P2P protocol network traffic employing a variable TCP port number for P2P connections.

15. The method of claim 14, wherein said controlling further comprises:

routing said P2P traffic to a P2P network gateway.

16. The method of claim 14, wherein said controlling further comprises:

routing said P2P traffic to a P2P network cache.

17. A router for controlling traffic on a data network, said traffic comprising payload data and associated signaling data, the router comprising:

a network interface that interfaces with said data network;

a packet switch coupled to the network interface that separates the traffic into peer-to-peer (P2P) traffic and non P2P traffic, wherein propagation of the P2P traffic is limited without limiting propagation of the non P2P traffic;

a data memory that stores data to be processed;

an instruction memory that stores computer executable code; and a processor coupled to said network interface, to said data memory, and to said instruction memory that processes said data in accordance with the computer-executable code stored in said instruction memory, whereby said processor is configured to:

read a portion of said payload data for a first traffic of a communications session between a first entity and a second entity communicating over said network;

using a signature in the portion of the payload data to determine whether said portion of payload data identifies the P2P;

store signaling data associated with said portion of payload data;

read signaling data for a second traffic on said network; and to compare said read signaling data with said stored signaling data to identify an attempt to begin a second communications session of said P2P traffic; and control said second communications session responsive to said identification.

18. The router of claim 17, wherein network comprises a packet data network, wherein said signaling data comprises a destination identifier to identify a destination of a packet of data comprising said first traffic, and wherein said storing stores a destination identifier for said first traffic that is the P2P traffic in said data memory responsive to identifying said P2P traffic.

19. The router of claim 18, wherein said processor is further configured to:

store portions of said payload data of said communications session sent from both said first and said second entity; and determine when communications from both said first and second entities are the P2P traffic.

* * * * *